United States Patent
Pfisterer et al.

(10) Patent No.: US 7,739,017 B2
(45) Date of Patent: Jun. 15, 2010

(54) DEVICE FOR CONTROLLING AN AUTOMATIC TRANSMISSION HAVING AN ELECTRONIC CONTROL UNIT

(75) Inventors: Markus Pfisterer, Puchheim (DE); Matthias Reichler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 868 days.

(21) Appl. No.: 11/605,219

(22) Filed: Nov. 29, 2006

(65) Prior Publication Data

US 2007/0129213 A1 Jun. 7, 2007

(30) Foreign Application Priority Data

Dec. 3, 2005 (DE) .................. 10 2005 057 805

(51) Int. Cl.
*B60W 10/04* (2006.01)
(52) U.S. Cl. .................................. 701/55; 701/56
(58) Field of Classification Search ............ 701/50–58, 701/60, 61, 64; 477/92, 115, 120
See application file for complete search history.

(56) References Cited

U.S. PATENT DOCUMENTS

| | | | |
|---|---|---|---|
| 5,961,420 A | 10/1999 | Darnell | |
| 6,442,467 B1 | 8/2002 | Schuler et al. | |
| 6,487,485 B1 | 11/2002 | Henneken et al. | |
| 6,807,472 B2 * | 10/2004 | Ford et al. | 701/58 |
| 7,241,249 B2 * | 7/2007 | Sawada et al. | 477/186 |
| 7,318,789 B2 * | 1/2008 | Saitou et al. | 477/143 |

FOREIGN PATENT DOCUMENTS

| | | |
|---|---|---|
| DE | 198 49 062 A1 | 4/2000 |
| DE | 697 22 830 T2 | 5/2004 |
| EP | 0 471 102 B1 | 2/1992 |
| EP | 1 117 951 B1 | 7/2001 |
| EP | 1 248 021 A1 | 10/2002 |

OTHER PUBLICATIONS

German search Report dated Sep. 13, 2006 (Nine (9) pages) Including Translation.

* cited by examiner

*Primary Examiner*—Richard M. Camby
(74) *Attorney, Agent, or Firm*—Crowell & Moring LLP

(57) ABSTRACT

For controlling an automatic transmission having an electronic control unit and having a power control element, the control unit detects a desired-power signal corresponding to the position of the power control element and, basically as a function of this desired-power signal, causes a change of gear corresponding to the characteristic shifting curves stored in the control unit. The control unit also generates a gradient signal corresponding to the rate of change of the desired-power signal and can—when certain conditions exist—cause a backshift deviating from the characteristic shifting curves as a function of this gradient signal. By way of the control unit, an immediate multiple backshift is initiated as a function of the gradient signal when, as a characteristic shifting curve for a first backshift has been reached, the gradient signal has exceeded at least a first lower limit value.

7 Claims, 1 Drawing Sheet

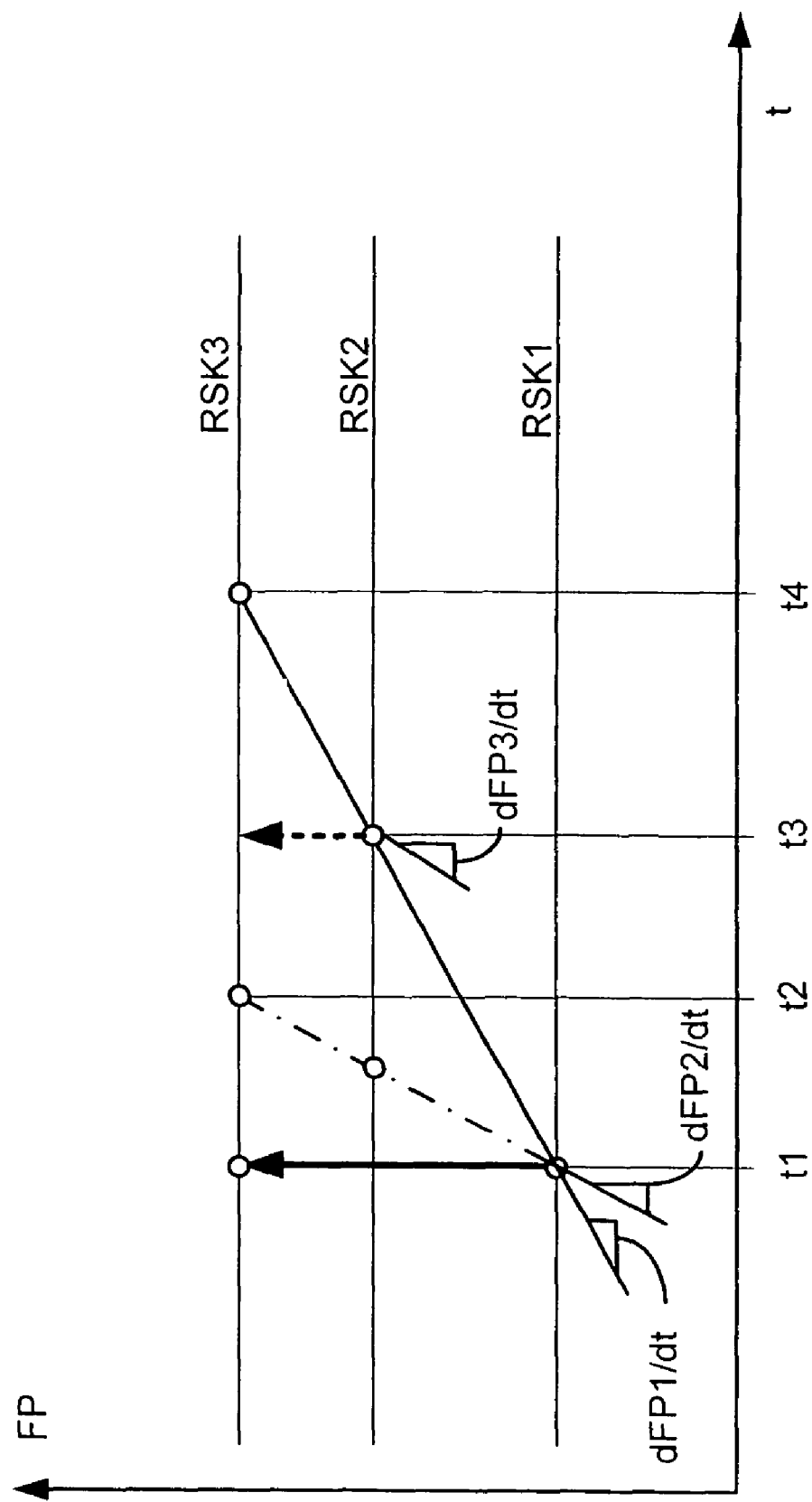

DEVICE FOR CONTROLLING AN AUTOMATIC TRANSMISSION HAVING AN ELECTRONIC CONTROL UNIT

This application claims the priority of German Application No. 10 2005 057 805.5, filed Dec. 3, 2005, the disclosure of which is expressly incorporated by reference herein.

BACKGROUND AND SUMMARY OF THE INVENTION

The invention relates to a device for controlling an automatic transmission having an electronic control unit. In particular, the invention relates to a device for controlling an automatic transmission having an electronic control unit and having a power control element, the control unit detecting a desired-power signal corresponding to the position of the power control element and, basically as a function of this desired-power signal, causing a change of gear corresponding to the characteristic shifting curves stored in the control unit, and the control unit generating a gradient signal corresponding to the rate of change of the desired-power signal and being able to cause a backshift deviating from the characteristic shifting curves as a function of this gradient signal.

Such a device is known, for example, from European Patent document EP 1 117 951 B1. In the case of this known device, backshifts are caused as a function of a gradient signal related to the desired power completely independently of the characteristic shifting curves. Furthermore, already caused backshifts are terminated again if the gradient signal falls below a defined lower limit value. As a result, uncomfortable pendulum shifts may occur.

It is an object of the invention to simultaneously take comfort aspects into account during shifting operations of an automatic transmission when adapting the dynamics to a driver's desired-load signal.

According to the invention, this is achieved by providing a device for controlling an automatic transmission having electronic control unit and having a power control element, the control unit detecting a desired-power signal corresponding to the position of the power control element and, basically as a function of this desired-power signal, causing a change of gear corresponding to the characteristic shifting curves stored in the control unit, and the control unit generating a gradient signal corresponding to the rate of change of the desired-power signal and being able to cause a backshift deviating from the characteristic shifting curves as a function of this gradient signal. The control unit is further developed such that an immediate backshift or multiple backshift is initiated as a function of the gradient signal when, as a characteristic shifting curve for a first backshift has been reached, the gradient signal has exceeded at least a first lower limit value.

In the case of the device according to the invention for controlling an automatic transmission having an electronic control unit and having a power control element, the control unit detects a desired-power signal corresponding to the position of the power control element and, basically as a function of this desired-power signal, causes a change of gear corresponding to the characteristic shifting curves stored in the control unit. Furthermore, the control unit generates a gradient signal corresponding to the rate of change of the desired-power signal and can—when certain conditions exist—cause a backshift deviating from the characteristic shifting curves as a function of this gradient signal. By way of the control unit, an immediate backshift, and if required, multiple backshifts, are initiated as a function of the gradient signal when, as a characteristic shifting curve for a first backshift has been reached, the gradient signal has exceeded at least a first lower limit value. The desired-power signal may correspond, for example, directly to the position of a power control element (such as the accelerator pedal or the throttle valve) or indirectly in the form of a desired torque (such as a desired engine torque or a desired wheel torque) or to a desired acceleration, both, as required, while also taking into account additional parameters.

With respect to the invention, the term "characteristic shifting curve" should be interpreted such that any fixedly stored default leading to a gear change is covered in the electronic control device. This may concern, for example, a gear change control based on characteristic shifting curves (known, for example, from European Patent document EP 0 471 102 B1) or a gear change control based on tension force (known, for example, from European Patent document EP 1 248 021 A1; here, the characteristic shifting curves are called tensile force curves).

Other objects, advantages and novel features of the present invention will become apparent from the following detailed description of the invention when considered in conjunction with the accompanying drawings.

BRIEF DESCRIPTION OF THE DRAWING

The FIGURE illustrates an embodiment of the invention, providing a schematic view of possible courses of a gradient signal and of backshifts as a function thereof.

DETAILED DESCRIPTION OF THE DRAWING

Referring to the FIGURE, the time t is shown on the x-axis, and the desired-load signal FP, reflecting, for example, the accelerator angle, is shown on the y-axis. The horizontal auxiliary lines show a first characteristic backshift curve RSK1, a second characteristic backshift curve RSK2 and a third characteristic backshift curve RSK3; here, only as a function of the desired-load signal FP. For example, in the case of a 5-gear automatic transmission, the first characteristic backshift curve RSK1 describes a gear change from the $5^{th}$ gear into the $4^{th}$ gear; the second characteristic backshift curve RSK2 describes a gear change from the $4^{th}$ gear into the $3^{rd}$ gear; and the third characteristic backshift curve RSK3 describes a gear change from the $3^{rd}$ gear into the $2^{nd}$ gear. If, in the shown drawing, the desired-load signal FP reaches the first characteristic backshift curve GSK1 at the point in time t1, the gradient signal is considered corresponding to the rate of change of the desired-load signal FP. If the gradient at the point in time t1 is lower than or equal to a first lower limit value dFP1/dt, the backshifts are caused exclusively as a function of the characteristic backshift curves. Accordingly therefore, at the point in time t1, a first backshift is caused from the $5^{th}$ gear into the $4^{th}$ gear; at the point in time t3, a second backshift is caused from the $4^{th}$ gear into the $3^{rd}$ gear; and, at the point in time t4, a third backshift takes place from the $3^{rd}$ gear into the $2^{nd}$ gear.

If the gradient at the point in time t1 is greater than the first lower threshold value dFP1/dt,—here, for example, with dFP2/dt, actually very great, according to the invention, an immediate multiple backshift is caused from the $5^{th}$ gear into the $2^{nd}$ gear (see thick curve with the arrow). Without the immediate multiple backshift according to the invention, in the presence of the dFP2/dt gradient at the point in time t1, backshifts would be carried out according to the dash-dotted line. The time period between the point in time t1 and the point in time t2 therefore represents the gain in dynamics according to the invention.

In one aspect of the invention, any number of gradient limit values may be defined above the first lower limit value, which lead to corresponding single or multiple backshifts. If, for example, when the first characteristic shifting curve RSK1 is reached at the point in time t1, a gradient between dFP1/dt and dFP2/dt were determined, according to the invention, only an immediate single backshift could also be caused.

According to another aspect of the invention, a single or multiple backshift can also be carried out as a function of the gradient starting from a gear which is not the highest gear. If, for example, in the case of a 6-gear automatic transmission, the $5^{th}$ is engaged and the gradient signal exceeds a first lower limit value, which may also be different for each starting gear, at the point in time of the reaching of the characteristic shifting curve for a backshift from the $5^{th}$ gear into the $4^{th}$ gear, here also, a multiple backshift can be caused into the $3^{rd}$ or $2^{nd}$ gear, for example, as a function of the gradient. In this example, a characteristic shifting curve for a first backshift would be the characteristic backshift curve from the $5^{th}$ gear into the $4^{th}$ gear. According to the invention, the characteristic shifting curve for a first backshift is therefore, the characteristic shifting curve for a first backshift starting from the momentarily engaged gear (starting gear).

The checking of the exceeding of a defined limit value is therefore carried out when each characteristic backshift curve has been reached (in the illustrated example, also at RSK2 and RSK3). A separate limit value can be defined for each reached characteristic backshift curve. This is illustrated as an example in the drawing by the broken arrow at the point in time t3 in connection with an immediate single backshift when the characteristic backshift curve RSK2 has been reached with the simultaneous exceeding of a limit value dFP3/dt defined in this respect.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for controlling an automatic transmission based on a power control element, comprising:
    an electronic control unit;
    wherein the control unit is operatively configured to detect a desired-power signal corresponding to a position of the power control element and, essentially as a function of the detected desired-power signal, cause a change of gear corresponding to characteristic shifting curves stored in the control unit;
    wherein the control unit is operatively configured to generate a gradient signal corresponding to a rate of change of the desired-power signal so as to be capable of causing a backshift deviating from the characteristic shifting curves as a function of the generated gradient signal; and
    wherein the control unit is operatively configured such that an immediate backshift or multiple backshift is initiated as a function of the gradient signal when, as a characteristic shifting curve for a first backshift has been reached, the gradient signal exceeds at least a first lower limit value.

2. The device according to claim 1, wherein the characteristic shifting curve for a first backshift is the characteristic shifting curve for the first backshift starting from a momentarily engaged gear.

3. The device according to claim 1, wherein at least the first lower limit value is defined as a function of a momentarily engaged gear.

4. The device according to claim 2, wherein at least the first lower limit value is defined as a function of the momentarily engaged gear.

5. A method of controlling an automatic transmission in order to perform a gear shifting operation, the method comprising the acts of:
    detecting a desired-power signal corresponding to a position of a power control element;
    causing a change of gear corresponding to characteristic shifting curves as a function of the desired-power signal;
    generating a gradient signal corresponding to a rate of change of the desired-power signal; and
    initiating an immediate backshift or a multiple backshift as a function of the gradient signal when the gradient signal exceeds at least a first lower limit value as a characteristic shifting curve for a first backshift is reached.

6. The method according to claim 5, wherein the characteristic shifting curve for the first backshift is defined as a curve for a first backshift beginning from a starting gear.

7. The method according to claim 6, wherein the first lower limit value is defined as a function of the starting gear.

* * * * *